(12) United States Patent
Kusumoto et al.

(10) Patent No.: US 7,045,250 B2
(45) Date of Patent: May 16, 2006

(54) NON-AQUEOUS ELECTROLYTE BATTERY

(75) Inventors: Yasuyuki Kusumoto, Moriguchi (JP); Masahisa Fujimoto, Osaka (JP); Shin Fujitani, Hirakata (JP); Masahide Miyake, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 245 days.

(21) Appl. No.: 09/986,067

(22) Filed: Nov. 7, 2001

(65) Prior Publication Data

US 2002/0090552 A1 Jul. 11, 2002

(30) Foreign Application Priority Data

Nov. 13, 2000 (JP) .................................... 2000-345124
Nov. 13, 2000 (JP) .................................... 2000-345491

(51) Int. Cl.
*H01M 4/52* (2006.01)
*H01M 4/48* (2006.01)

(52) U.S. Cl. ............... 429/221; 429/231.95; 429/218.1; 429/231.3

(58) Field of Classification Search ................. 429/221, 429/231.95, 218.1, 224, 223, 231.3
See application file for complete search history.

(56) References Cited

U.S. PATENT DOCUMENTS 5,112,704 A  5/1992  Furukawa et al.

FOREIGN PATENT DOCUMENTS

| | | |
|---|---|---|
| JP | 59-221975 | 12/1984 |
| JP | 02-015566 | 1/1990 |
| JP | 5-62679 | 3/1993 |
| JP | 07-065867 | 3/1995 |
| JP | 09-283184 | 10/1997 |
| JP | 11-260403 | 9/1999 |
| JP | 11-354118 | 12/1999 |
| JP | 2000-243392 | * 9/2000 |
| JP | 2001-266851 | 9/2001 |
| JP | 2001-283852 | 10/2001 |
| JP | 2002-083594 | 3/2002 |
| WO | WO 99/36594 | 7/1999 |

OTHER PUBLICATIONS

David Linden, Handbook of Batteries, 1995, McGraw-Hill, Inc., Second Ed., pp. 36.5, 36.19, 36.65.*

Ito et al., Lithium secondary battery using potassium-B-ferrite as a new cathode active material, Solid State Ionics, 113-115 (1998) 17-21.*

Nobuyuki Imanishi, et al., Study on Electrochemical Sodium Deintercalation of $\alpha$-$Na_xFeO_2$, Denki Kagaku vol. 61 No. 12, pp. 1451-1452, 1993.

* cited by examiner

Primary Examiner—Patrick Joseph Ryan
Assistant Examiner—Angela J. Martin
(74) Attorney, Agent, or Firm—Westerman, Hattori, Daniels & Adrian, LLP

(57) ABSTRACT

In a non-aqueous electrolyte battery provided with a positive electrode, a negative electrode, and a non-aqueous electrolyte using an organic solvent, at least one type of ferrite, $FeS_2$, and a transition metal oxide (except for $LiCoO_2$) having crystal structure of space group R3m is used as a positive electrode material for a positive electrode, and a negative electrode material containing lithium is used for a negative electrode.

7 Claims, 10 Drawing Sheets

NON-AQUEOUS ELECTROLYTE BATTERY

BACKGROUND OF THE INVENTION

1. Field of the Invention

The present invention relates generally to a non-aqueous electrolyte battery provided with a positive electrode, a negative electrode, and a non-aqueous electrolyte using an organic solvent, and particularly, is characterized in that a non-aqueous electrolyte battery having a high battery capacity is obtained upon improvement of a positive electrode material used for the positive electrode.

2. Description of the Related Art

Recently, as one type of advanced batteries featuring high power and high energy density, a non-aqueous electrolyte battery has come into practical use, wherein a non-aqueous electrolyte solution using an organic solvent is employed and discharge/charge is performed by way of transferring lithium ions between a positive electrode and a negative electrode.

In such a non-aqueous electrolyte battery, a lithium-transition metal compound oxide capable of occluding and discharging lithium such as $LiCoO_2$ and the like has been generally used as a positive electrode material for the positive electrode, and a carbon material such as graphite and the like as a negative electrode material for the negative electrode.

In a non-aqueous electrolyte battery as described above, a specific capacity of graphite as the negative electrode material is about 370 Ah/kg. On the other hand, when $LiCoO_2$ is used as the positive electrode material, Li contained in $LiCoO_2$ is not sufficiently discharged, and accordingly, a specific capacity of $LiCoO_2$ is as low as 150 Ah/kg. Energy density of such a non-aqueous electrolyte battery is about 150 Wh/kg.

Recently, however, such a non-aqueous electrolyte battery has come into practical use as an electric current source of a cordless telephone, a personal computer, and the like, and accordingly, it has been desired that a high battery capacity of the above-mentioned non-aqueous electrolyte battery is obtained upon further improvement of energy density thereof.

Further, in recent years, it has been discussed that $Fe_2O_3$ and $FeS_2$ are used as the positive electrode material of the non-aqueous electrolyte battery. However, $Fe_2O_3$ and $FeS_2$ have been used as a positive electrode material and the like only for a primary battery and a high-temperature battery, that is, have not been utilized effectively in a non-aqueous electrolyte battery provided with a non-aqueous electrolyte using an organic solvent.

SUMMARY OF THE INVENTION

An object of the present invention is, in a non-aqueous electrolyte battery provided with a positive electrode, a negative electrode, and a non-aqueous electrolyte using an organic solvent, to improve a specific capacity of a positive electrode material used for a positive electrode, thereby obtaining a non-aqueous electrolyte battery having a high battery capacity.

A non-aqueous electrolyte battery according to a first aspect of the present invention is provided with a positive electrode, a negative electrode, and a non-aqueous electrolyte using an organic solvent, and uses for the positive electrode a positive electrode material containing at least ferrite and as a negative electrode material for the negative electrode a lithium alloy.

A non-aqueous electrolyte battery according to a second aspect of the present invention is provided with a positive electrode, a negative electrode, and a non-aqueous electrolyte using an organic solvent, and uses for the positive electrode a positive electrode material containing at least $FeS_2$ and as a negative electrode material for the negative electrode a lithium alloy.

In the non-aqueous electrolyte batteries according to the first and second aspects of the present invention, discharge is performed first and foremost so as to intercalate lithium contained in the negative electrode material composed of a lithium alloy used for the negative electrode into the positive electrode material composed of ferrite or $FeS_2$ used for the positive electrode, after which, lithium ions are transferred between the positive electrode and the negative electrode, to perform discharge/charge.

When discharge is performed first and foremost so as to intercalate lithium contained in a lithium alloy as the negative electrode material into ferrite or $FeS_2$ as the positive electrode material as described above, a large amount of lithium is contributed to discharge/charge, thereby improving a specific capacity of the positive electrode material, resulting in increased energy density of the non-aqueous electrolyte battery. Therefore, a non-aqueous electrolyte battery having a high battery capacity is obtained.

In the above-mentioned non-aqueous electrolyte battery according to the first aspect of the present invention, examples of usable ferrite as the positive electrode material include $Fe_2O_3$, $Fe_3O_4$, $MnFe_2O_4$, $NiFe_2O_4$, $CoFe_2O_4$, $K_{1.4}Fe_{11}O_{17}$, and the like. In particular, in the case where $CoFe_2O_4$ is used as the positive electrode material, lithium contained in a lithium alloy as the negative electrode material is intercalated into $CoFe_2O_4$ by way of the initial discharge, after which, lithium is properly discharged from $CoFe_2O_4$ during charging, thereby improving extremely a specific capacity of the positive electrode material, resulting in remarkably increased energy density. Therefore, the non-aqueous electrolyte battery having a high battery capacity is obtained.

In the non-aqueous electrolyte batteries according to the first and second aspects of the present invention, examples of usable lithium alloy as the negative electrode material include lithium alloy for all types. More specifically, it is preferable that a lithium alloy (Li—Si) having a high specific capacity is used.

Further, a non-aqueous electrolyte battery according to a third aspect of the present invention is provided with a positive electrode, a negative electrode, and a non-aqueous electrolyte using an organic solvent, and uses as a positive electrode material for the positive electrode a transition metal oxide (except for $LiCoO_2$) having crystal structure of space group R3m and for the negative electrode a negative electrode material containing lithium.

In the non-aqueous electrolyte battery according to the third aspect of the present invention, discharge is performed first and foremost so as to intercalate lithium contained in the negative electrode material for the negative electrode into the positive electrode material using the transition metal oxide (except for $LiCoO_2$) having the crystal structure of space group R3m, after which, lithium ions are transferred between the positive electrode and the negative electrode, to perform discharge/charge, as shown above in the non-aqueous electrolyte batteries according to the first and second aspects of the present invention.

When discharge is performed first and foremost so as to intercalate lithium contained in the negative electrode material for the negative electrode into the positive electrode material using the transition metal oxide (except for $LiCoO_2$) having the crystal structure of space group R3m, as described above, a large amount of lithium is contributed to discharge/charge, thereby improving a specific capacity of the positive electrode material, resulting in increased energy density of the non-aqueous electrolyte battery. Therefore, the non-aqueous electrolyte battery having a high battery capacity is obtained.

Examples of usable transition metal oxide having the crystal structure of space group R3m include $NaFeO_2$, $LiNiO_2$, $LiCoO_2$, and the like. However, in the case where $LiCoO_2$ is used as the positive electrode material, when lithium contained in the negative electrode material is intercalated into $LiCoO_2$ by way of the aforementioned discharge, lithium is not discharged from $LiCoO_2$ during the charging after the intercalation. It is supposed that the reason why lithium is not discharged from $LiCoO_2$ as shown above, is that the intercalation of lithium changes the crystal structure of $LiCoO_2$.

On the other hand, in the case where transition metal oxides other than $LiCoO_2$ having the crystal structure of space group R3m are used, when lithium contained in the negative electrode material is intercalated into the positive electrode material by way of the aforementioned discharge, and then charge is performed, lithium is properly discharged from the positive electrode material, resulting in the improved specific capacity of the positive electrode material. In particular, in the case where $NaFeO_2$ is used for the positive electrode material, the specific capacity of the positive electrode material is extremely improved, resulting in remarkably increased energy density. Therefore, the non-aqueous electrolyte battery having a high battery capacity is obtained.

Furthermore, in the non-aqueous electrolyte battery according to the third aspect of the present invention, any materiel can be used as the negative electrode material for the negative electrode as long as the material can contain lithium and serve to supply lithium into the above-mentioned positive electrode material by way of the afore-mentioned discharge as describe above. Examples of usable material include lithium metal and lithium alloy for all types. In addition, a carbon material and the like which have lithium occluded therein can be used. More specifically, it is preferable that a lithium alloy (Li—Si) having a high specific capacity can be used.

Moreover, in the non-aqueous electrolyte batteries according to the first to third aspects of the present invention, as the non-aqueous electrolyte using the organic solvent, ones that have been generally used can be employed.

As the organic solvent used for the non-aqueous electrolyte, well-known ones that have been generally used in a non-aqueous electrolyte solution can be employed. More specifically, cyclic carbonic ester such as ethylene carbonate, propylene carbonate, buthylene carbonate, vinylene carbonate, and the like, and chain carbonic ester such as dimethyl carbonate, diethyl carbonate, dipropyl carbonate, ethyl methyl carbonate, ethyl propyl carbonate, and the like, can be used alone or in combination of two or more types.

Further, in the non-aqueous electrolyte, as a solute being dissolved in the above-mentioned organic solvent, well-known ones can be used. More specifically, a lithium compound such as trifluoro-methanesulfonic acid lithium ($LiCF_3SO_3$), hexafluorophosphoric acid lithium ($LiPF_6$), perchloric acid lithium ($LiClO_4$), tetrafluoroboric acid lithium ($LiBF_4$), trifluoro-methanesulfonic acid imide lithium $\{LiN (CF_3SO_2)_2\}$, and the like can be used.

Moreover, in the non-aqueous electrolyte batteries according to the first to third aspects of the present invention, as a separator separating the positive electrode and the negative electrode, well-known ones which have been generally used can be used.

These and other objects, advantages and features of the invention will become apparent from the following description thereof taken in conjunction with the accompanying drawings which illustrate specific embodiment of the invention.

BRIEF DESCRIPTION OF THE DRAWINGS

FIG. 12 is a diagram illustrating characteristics of discharge/charge at a first cycle in a test cell according to Example A6 of the present invention wherein $K_{1.4}Fe_{11}O_{17}$ is used as a positive electrode material;

FIG. 13 is a diagram illustrating characteristics of discharge/charge at a second cycle in the test cell according to the above-mentioned Example A6;

FIG. 14 is a diagram illustrating characteristics of discharge/charge at a first cycle in a test cell according to Example B1 of the present invention wherein $FeS_2$ is used as a positive electrode material;

DESCRIPTION OF THE PREFERRED EMBODIMENTS

Next, the non-aqueous electrolyte battery according to the present invention will be described in detail by way of reference to Examples of the present invention. Furthermore, the description will also make apparent by way of comparison that in the non-aqueous electrolyte batteries according to Examples, a specific capacity of a positive electrode material is improved, resulting in increased energy density, whereby obtaining a high battery capacity. It is to be distinctly appreciated that the non-aqueous electrolyte battery according to the present invention should not be limited to the following Examples but appropriate changes and modifications may be made in carrying out the present invention without departing from the spirit and scope of the present invention.

EXAMPLES A1 to A6

In each of Examples A1 to A6, each of positive electrodes and a non-aqueous electrolyte solution that were prepared as follows were used.

Preparation of Positive Electrode

In the preparation of a positive electrode, in Example A1, $Fe_2O_3$ was used as a positive electrode material. Further, $Fe_2O_3$ as the positive electrode material, acetylene black as a conductive agent, and polytetrafluoroethylene as a binding agent were mixed with each other in a ratio of 40 to 40 to 20 by weight, were formed by pressure into a disk of a diameter of 16 mm and a thickness of 0.1 mm. The resultant disk was dried in vacuum at 110° C., thereby to give the positive electrode of Example A1.

Besides, in Examples A2 to A6, each of positive electrodes was prepared in the same manner as in the above-mentioned Example A1 except that the type of the positive electrode material in Example A1 was changed. More specifically, $Fe_3O_4$ is used as a positive electrode material in Example A2, $MnFe_2O_4$ in Example A3, $NiFe_2O_4$ in Example A4, $CoFe_2O_4$ in Example A5, and $K_{1.4}Fe_{11}O_{17}$ in Example A6.

Preparation of Non-aqueous Electrolyte Solution

In the preparation of a non-aqueous electrolyte solution, ethylene carbonate and dimethyl carbonate were mixed in a volume ratio of 1 to 1, to give a mixture solvent, in which a solute of hexafluorophosphoric acid lithium ($LiPF_6$) was dissolved in a concentration of 1 mol/kg.

Figure 1:
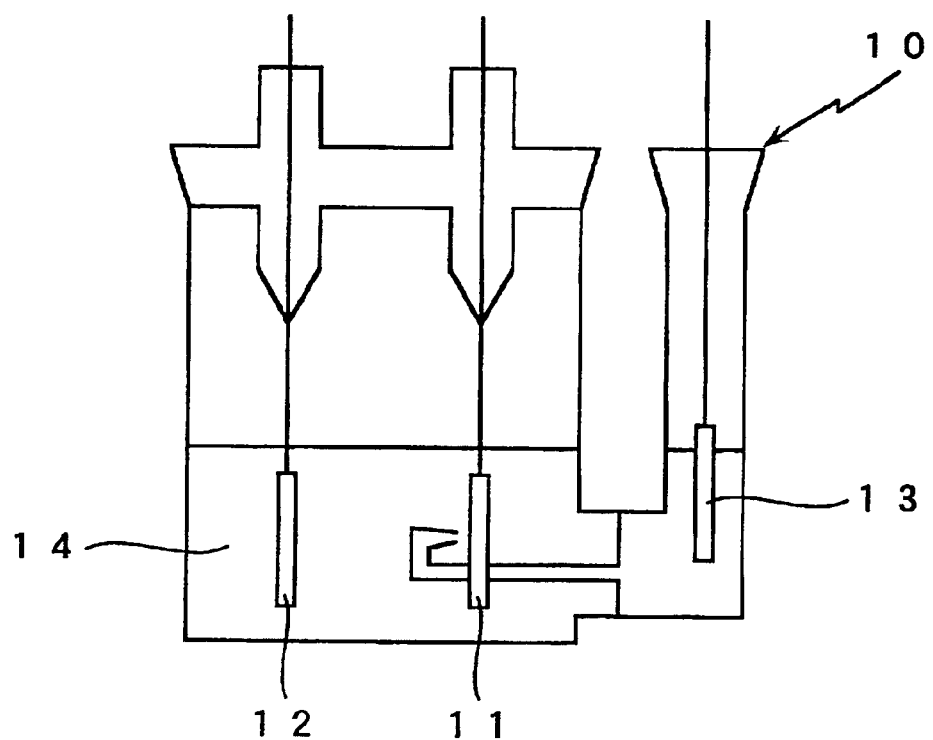
FIG. 1 is a schematic explanatory view illustrating a test cell fabricated in each of Examples according to the present invention.

Next, as shown in FIG. 1, the non-aqueous electrolyte solution 14 prepared as described above was contained in a test cell 10 as well as each of the positive electrodes prepared as described above was used for a working electrode 11 and lithium metal was used for a counter electrode 12 as a negative electrode and for a reference electrode 13.

Further, each of test cells according to Examples A1 to A6 wherein each of the above-mentioned positive electrodes was used for a working electrode 11 was subject to discharge at a 2 mA/cm² discharging current to a potential of the working electrode 11 to the reference electrode 13 of 0.5 V, followed by charge at a 2 mA/cm² charging current to a potential of the working electrode 11 to the reference electrode 13 of 4.0 V. Afterward, discharge/charge was repeatedly performed in a cycle of the above-mentioned discharge/charge process, so that 10 cycles of discharge/charge were performed.

Figure 2:
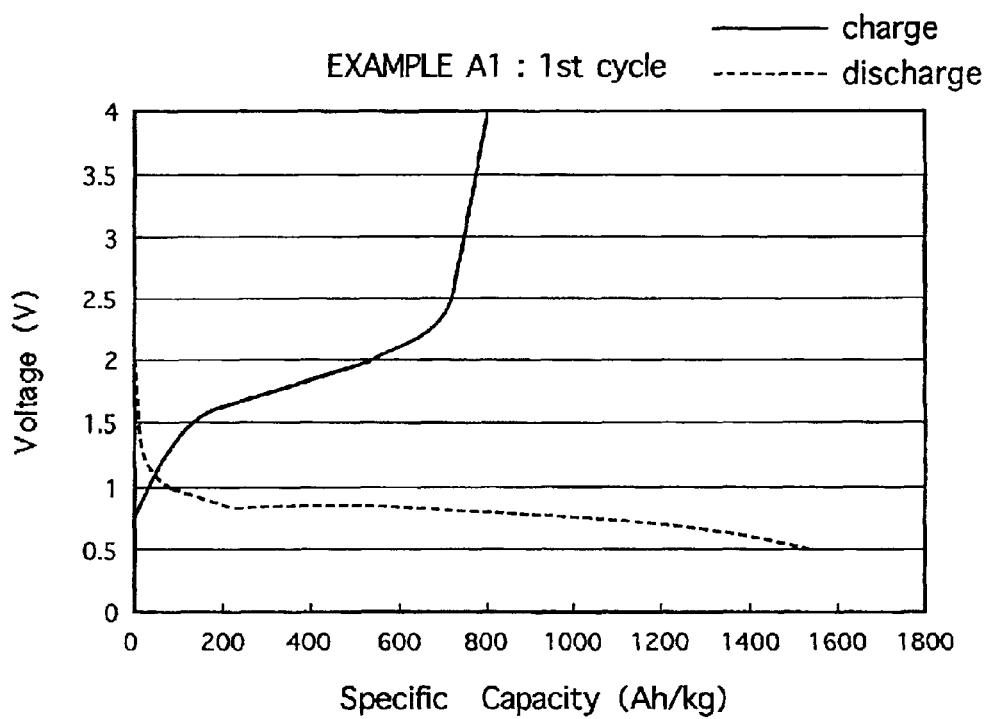
FIG. 2 is a diagram illustrating characteristics of discharge/charge at a first cycle in a test cell according to Example A1 of the present invention wherein $Fe_2O_3$ is used as a positive electrode material.
Figure 3:
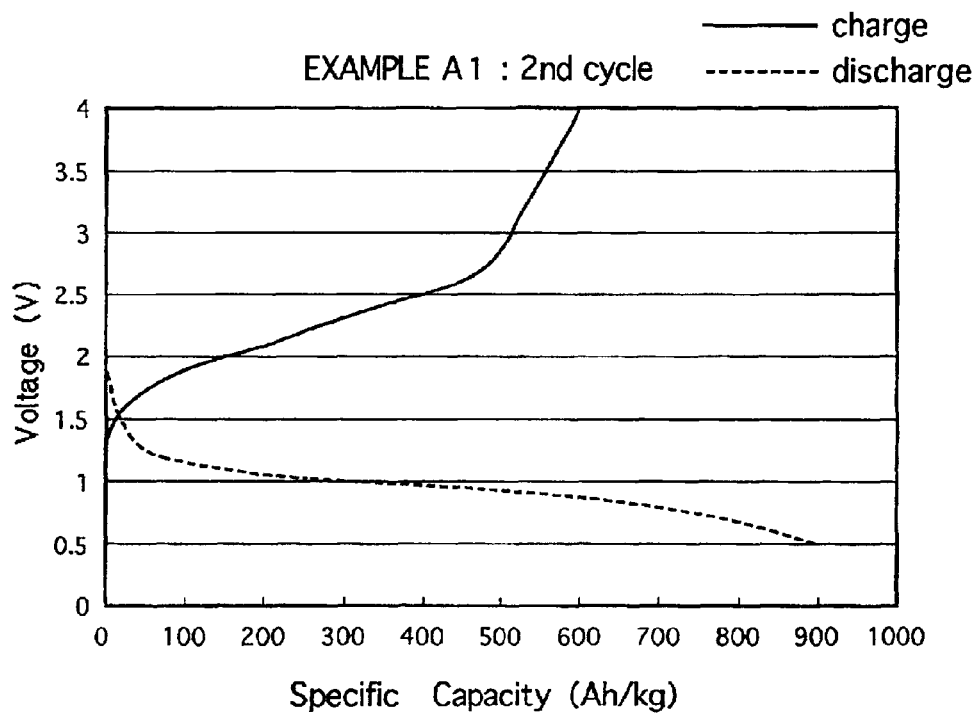
FIG. 3 is a diagram illustrating the characteristics of discharge/charge at a second cycle in the test cell according to the above-mentioned Example A1.

With regard to the test cell according to Example A1 wherein $Fe_2O_3$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line described in a solid line in FIG. 2. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line described in a solid line in FIG. 3.

Figure 4:
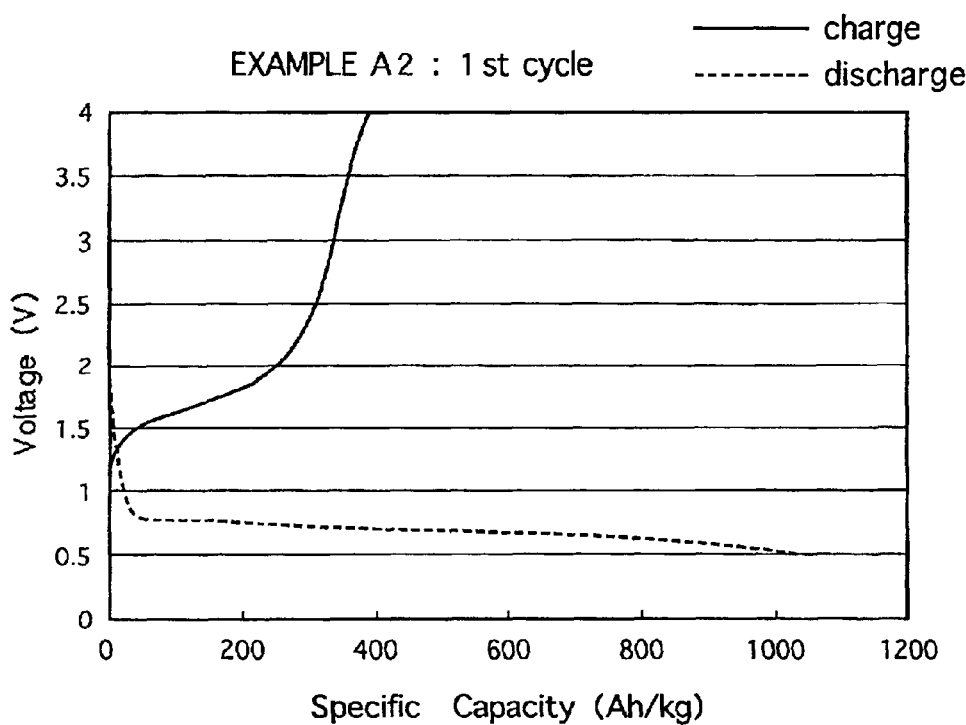
FIG. 4 is a diagram illustrating characteristics of discharge/charge at a first cycle in a test cell according to Example A2 of the present invention wherein $Fe_3O_4$ is used as a positive electrode material.
Figure 5:
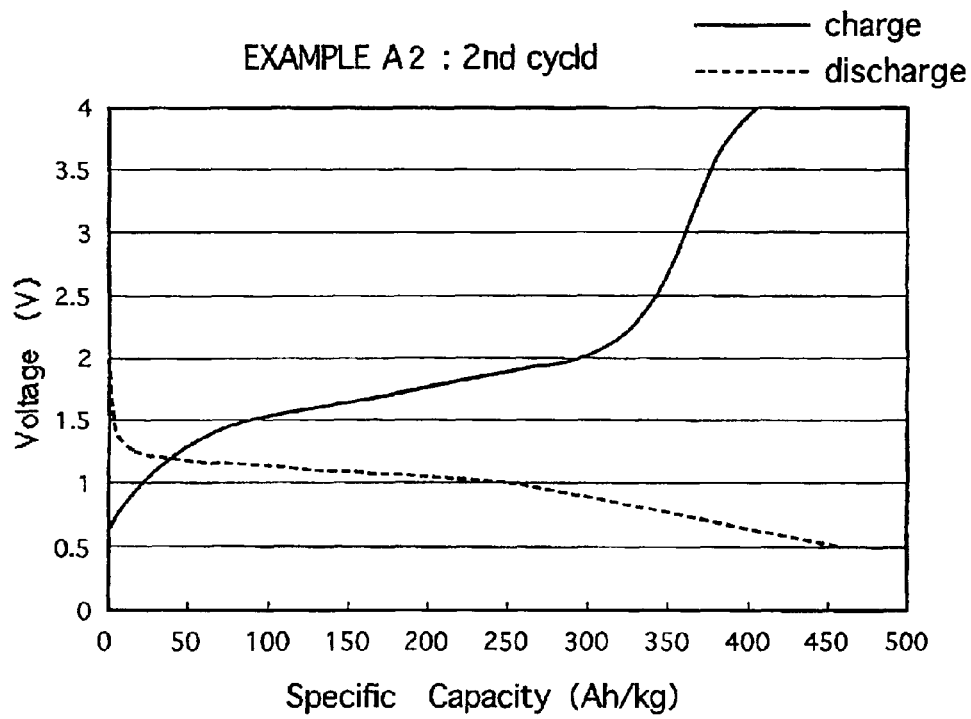
FIG. 5 is a diagram illustrating characteristics of discharge/charge at a second cycle in the test cell according to the above-mentioned Example A2.

Further, with regard to the test cell according to Example A2 wherein $Fe_3O_4$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line described in a solid line in FIG. 4. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line described in a solid line in FIG. 5.

Figure 6:
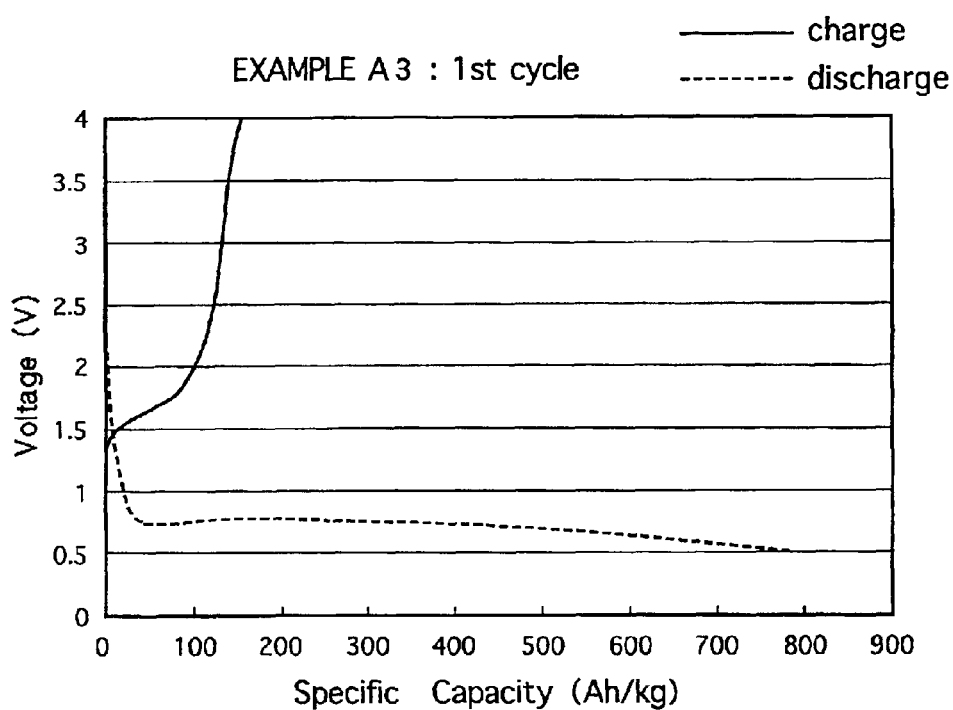
FIG. 6 is a diagram illustrating characteristics of discharge/charge at a first cycle in a test cell according to Example A3 of the present invention wherein $MnFe_2O_4$ is used as a positive electrode material.
Figure 7:
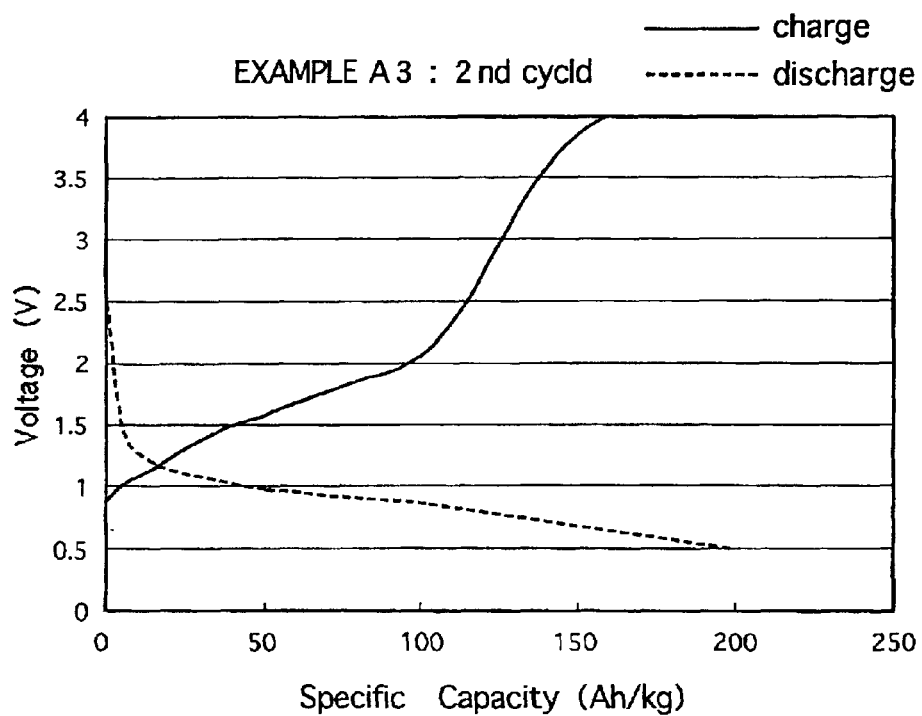
FIG. 7 is a diagram illustrating characteristics of discharge/charge at a second cycle in the test cell according to the above-mentioned Example A3.

Moreover, with regard to the test cell according to Example A3 wherein $MnFe_2O_4$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line described in a solid line in FIG. 6. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line described in a solid line in FIG. 7.

Figure 8:
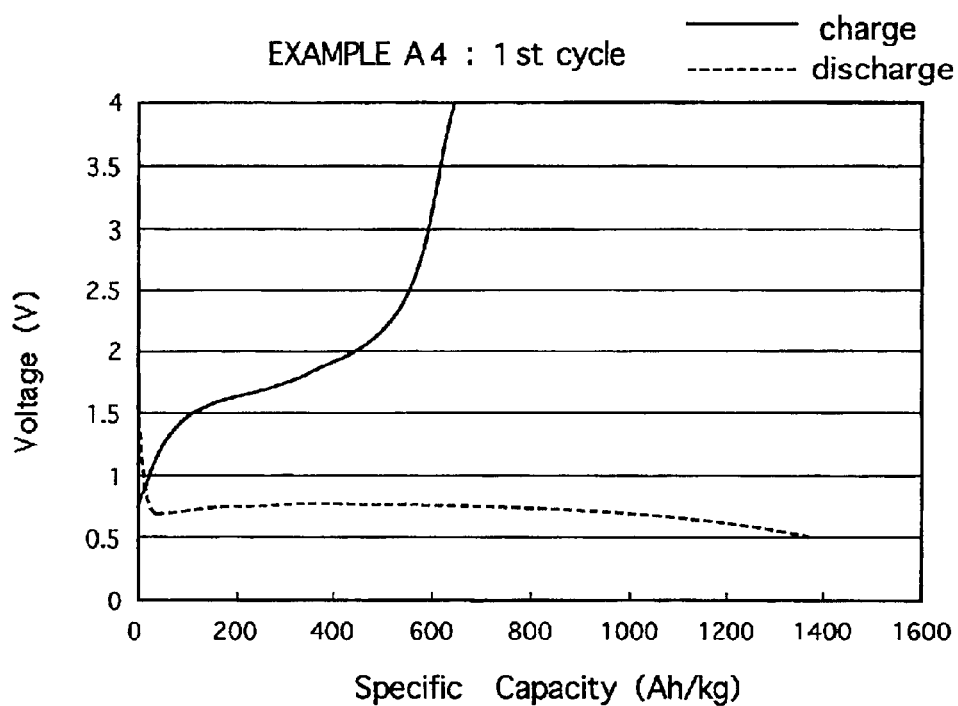
FIG. 8 is a diagram illustrating characteristics of discharge/charge at a first cycle in a test cell according to Example A4 of the present invention wherein $NiFe_2O_4$ is used as a positive electrode material.
Figure 9:
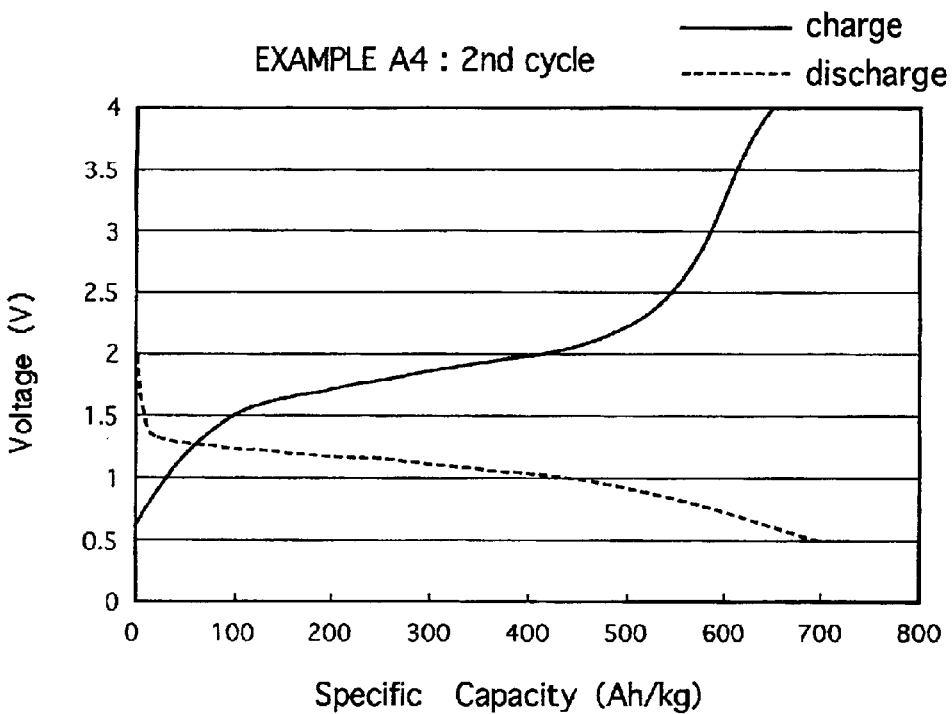
FIG. 9 is a diagram illustrating characteristics of discharge/charge at a second cycle in the test cell according to the above-mentioned Example A4.

Continually, with regard to the test cell according to Example A4 wherein $NiFe_2O_4$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line described in a solid line in FIG. 8. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line described in a solid line in FIG. 9.

Figure 10:
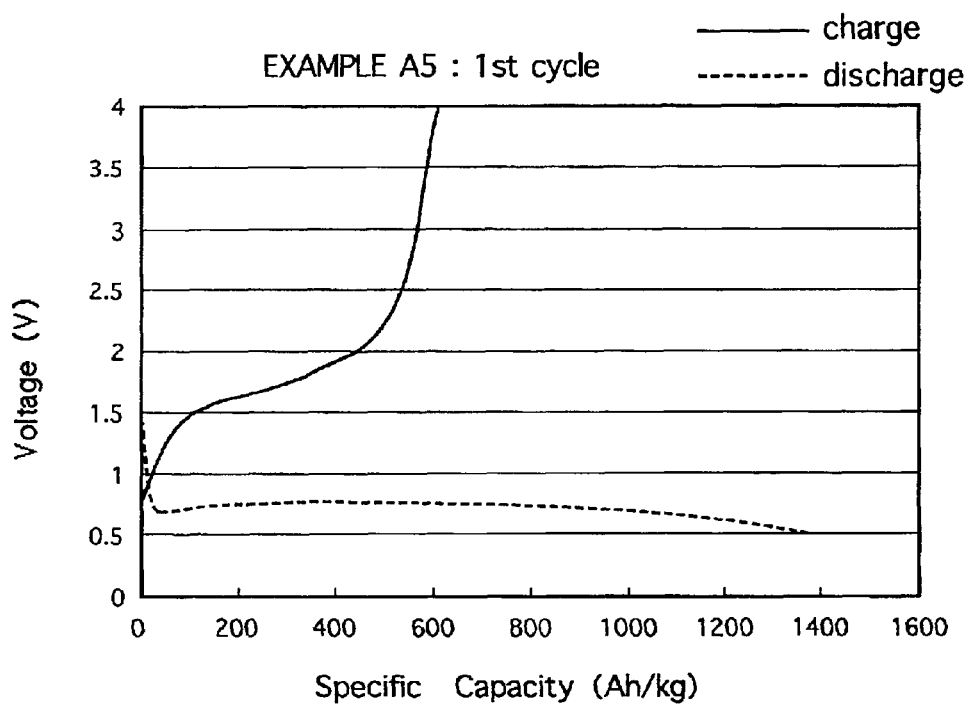
FIG. 10 is a diagram illustrating characteristics of discharge/charge at a first cycle in a test cell according to Example A5 of the present invention wherein $CoFe_2O_4$ is used as a positive electrode material.
Figure 11:
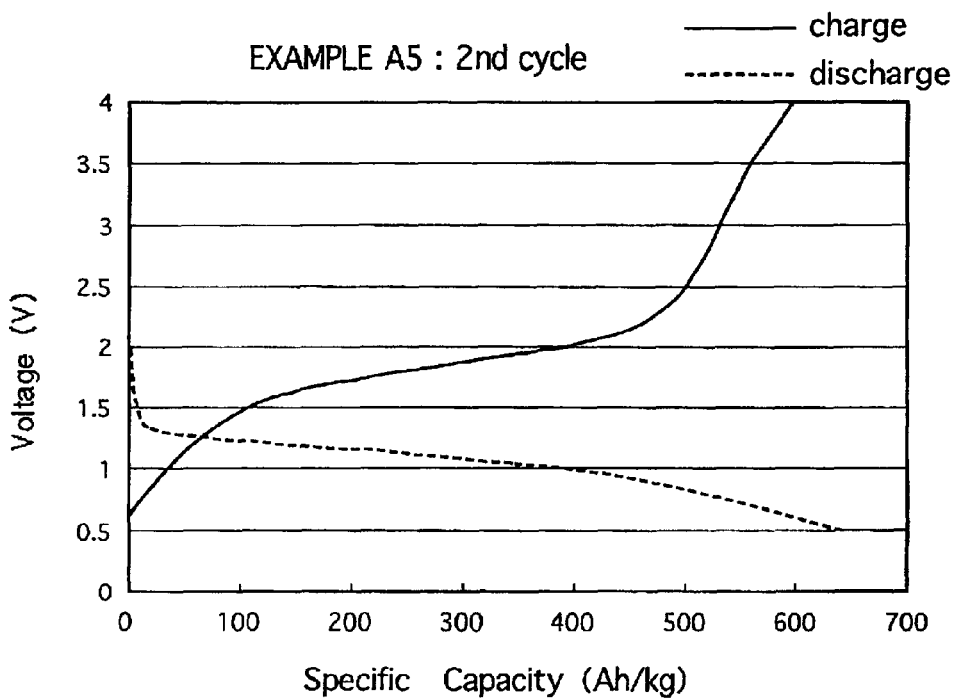
FIG. 11 is a diagram illustrating characteristics of discharge/charge at a second cycle in the test cell according to the above-mentioned Example A5.
Figure 1:
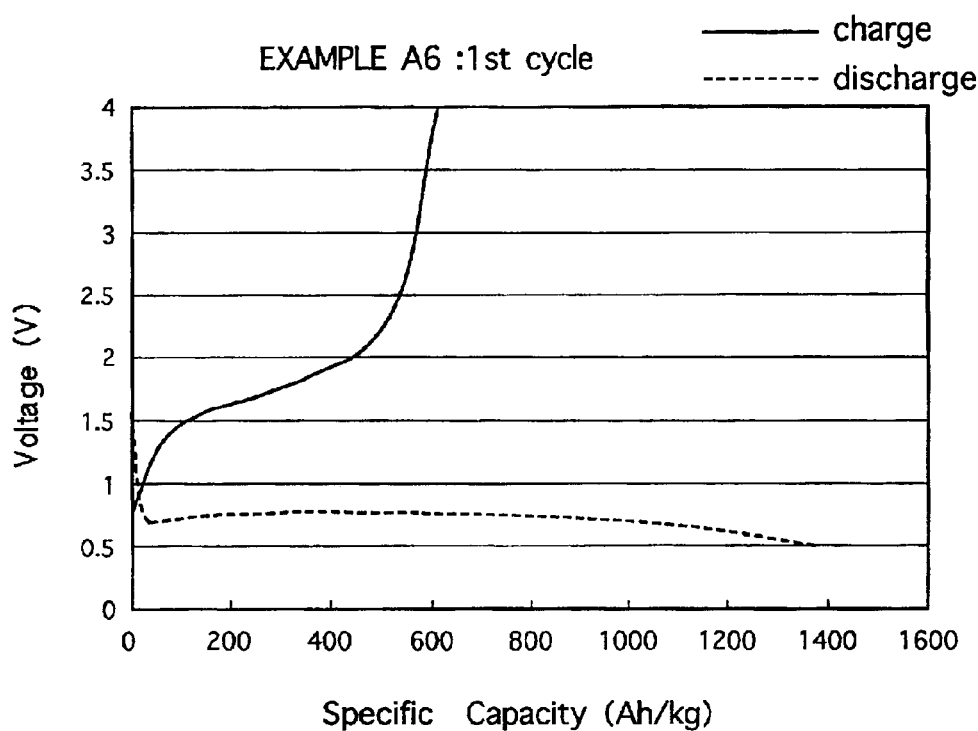
Figure 1:
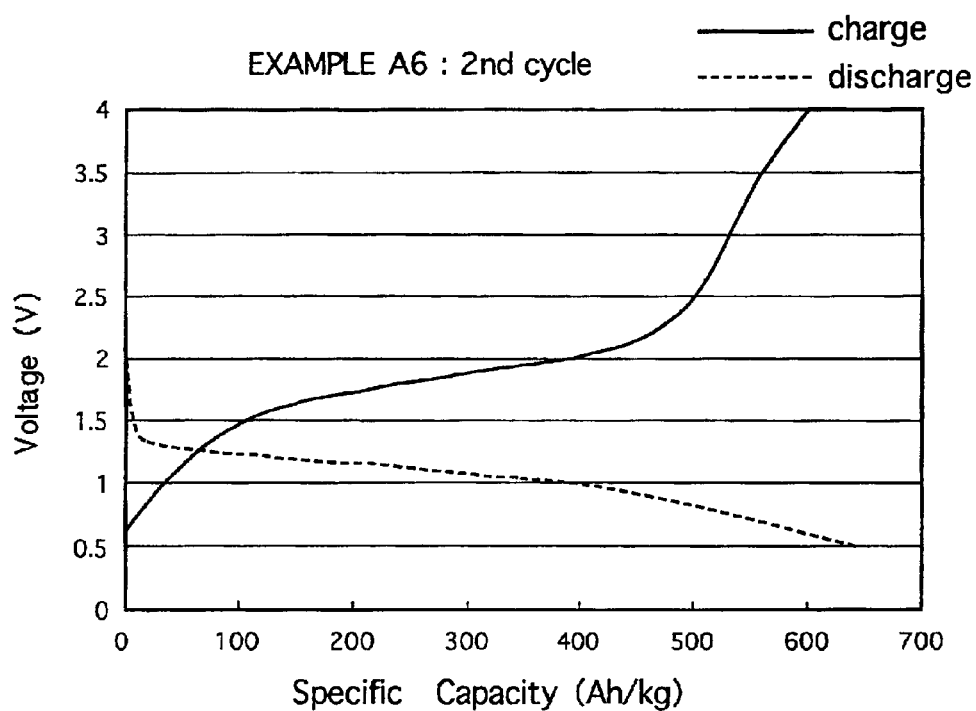
Figure 1:
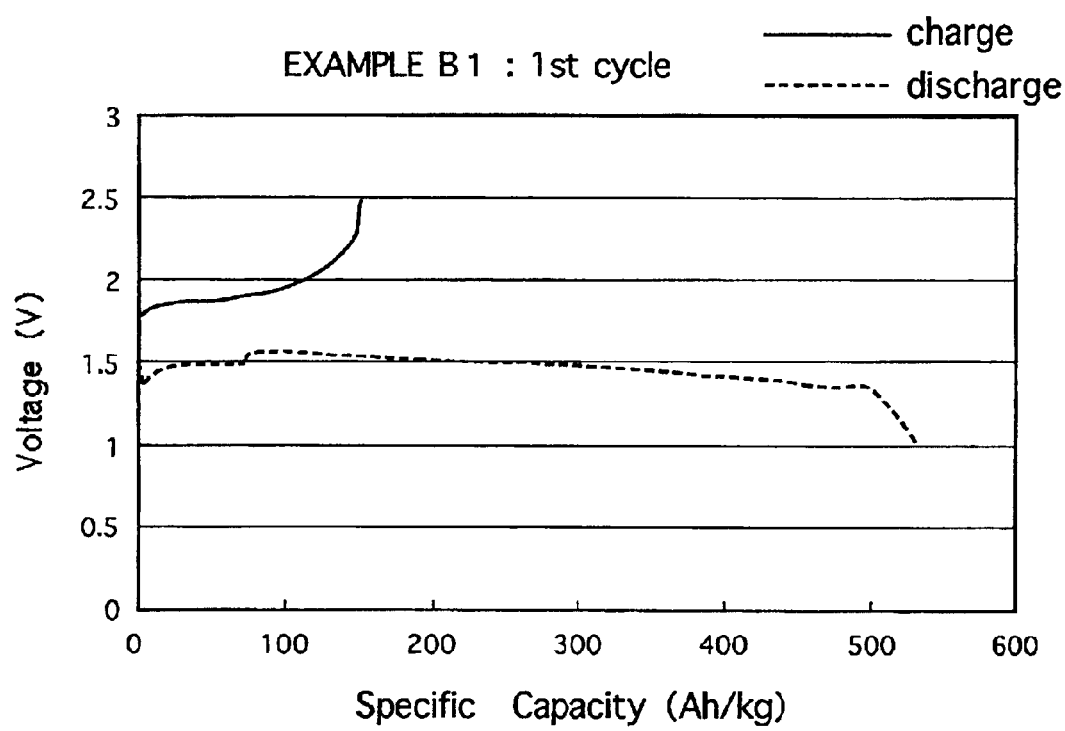

Furthermore, with regard to the test cell according to Example A5 wherein $CoFe_2O_4$ is used as the positive electrode material, a relationship of a voltage and a specific capacity (Ah/kg) of the positive electrode material at a first discharge is graphed out as a discharge curved line described in a broken line while a relationship of a voltage and specific capacity (Ah/kg) of the positive electrode material at a first charge is graphed out as a charge curved line described in a solid line in FIG. 10. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line in a solid line in FIG. 11.

In addition, with regard to the test cell according to Example A6 wherein $K_{1.4}Fe_{11}O_{17}$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line in a solid line in FIG. 12. Additionally, a relationship of a voltage and a specific capacity (Ah/kg) of the positive electrode material at a second discharge is graphed out as a discharge curved line described in a broken line while a relationship of a voltage and a specific capacity (Ah/kg) of the positive electrode material at a second charge is graphed out as a charge curved line described in a solid line in FIG. 13.

Besides, in the above-mentioned case where discharge/charge was performed using each of the positive electrodes according to Examples A1 to A6, the specific capacity (Ah/kg) of each of the positive electrodes at the discharges of the first and tenth cycles as well as a ratio of charge capacity to discharge capacity at the tenth cycle, that is, discharge/charge efficiency (%) at the tenth cycle were found. The results are shown in the following Table 1.

TABLE 1

| positive electrode material | specific capacity (Ah/kg) first cycle | specific capacity (Ah/kg) tenth cycle | discharge/ charge efficiency at tenth cycle (%) |
|---|---|---|---|
| Example A1 | $Fe_2O_3$ | 1531 | 125 | 94 |
| Example A2 | $Fe_3O_4$ | 1013 | 272 | 98 |
| Example A3 | $MnFe_2O_4$ | 777 | 154 | 100 |
| Example A4 | $NiFe_2O_4$ | 1370 | 384 | 98 |
| Example A5 | $CoFe_2O_4$ | 1379 | 478 | 99 |
| Example A6 | $K_{1.4}Fe_{11}O_{17}$ | 1300 | 342 | 98 |

As apparent from the results, in the case where $Fe_2O_3$, $Fe_3O_4$, $MnFe_2O_4$, $NiFe_2O_4$, $CoFe_2O_4$, and $K_{1.4}Fe_{11}O_{17}$ which are ferrite are used as the positive electrode material, the specific capacity of each of the positive electrode materials at the discharge of the first cycle is higher than that of about 150 Ah/kg of $LiCoO_2$ which has been conventionally used as the positive electrode material. Further, it is also apparent that in Examples A2, A4, A5 and A6 wherein $Fe_3O_4$, $NiFe_2O_4$, $CoFe_2O_4$, and $K_{1.4}Fe_{11}O_{17}$ are used as the positive electrode material, the specific capacity of the positive electrode material at the discharge of the tenth cycle is higher than that of $LiCoO_2$ which has been conventionally used. It is to be distinctly noted that, in Example 5 wherein $CoFe_2O_4$ is used as the positive electrode material, the specific capacity of the positive electrode material is extremely higher.

Further, in Examples A1 to A6, discharge/charge efficiency at the tenth cycle was approximately 100%, making it possible to charge and discharge stably.

Next, in each of the non-aqueous electrolyte batteries according to Examples A1 to A6 wherein $Fe_2O_3$, $Fe_3O_4$, $MnFe_2O_4$, $NiFe_2O_4$, $CoFe_2O_4$, and $K_{1.4}Fe_{11}O_{17}$ are used as the positive electrode material while a lithium-alloy (Li—Si) having the specific capacity of 3000 Ah/kg which is disclosed in the Japanese Patent Laid-Open No. 2000-321200 and the Japanese Patent Laid-Open No. 2000-321201 is used as the negative electrode material, and in the non-aqueous electrolyte battery according to Comparative Example wherein $LiCoO_2$ having the specific capacity of 150 Ah/kg is used as the positive electrode material while graphite having the specific capacity of 370 Ah/kg is used as the negative electrode material, capacity density (Ah/kg) at the discharge of the first cycle is found by way of the following formula (1). The lithium alloy may include Ag, Al, Au, Bi, Ca, Co, Ga, Ge, Hg, In, Ir, Mg, Pb, Pd, Pt, Rh, Sb, Se, Si, Sn, Sr and Zn. Furthermore, energy density (Wh/kg) is found by way of the following formula (2). The results are shown in the following Table 2.

capacity density=(specific capacity of positive electrode material× specific capacity of negative electrode material)/(specific capacity of positive electrode material+specific capacity of negative electrode material)  (1)

energy density=capacity density×battery voltage  (2)

TABLE 2

| | positive electrode material | negative electrode material type | specific capacity (Ah/kg) | capacity density (Ah/kg) | energy density (Wh/kg) |
|---|---|---|---|---|---|
| Example A1 | $Fe_2O_3$ | Li—Si | 3000 | 1014 | 770 |
| Example A2 | $Fe_3O_4$ | Li—Si | 3000 | 757 | 454 |
| Example A3 | $MnFe_2O_4$ | Li—Si | 3000 | 617 | 432 |
| Example A4 | $NiFe_2O_4$ | Li—Si | 3000 | 941 | 564 |
| Example A5 | $CoFe_2O_4$ | Li—Si | 3000 | 945 | 567 |
| Example A6 | $K_{1.4}Fe_{11}O_{17}$ | Li—Si | 3000 | 907 | 544 |
| Comparative Example | $LiCoO_2$ | Graphite | 370 | 107 | 384 |

As apparent from the results, each of the non-aqueous electrolyte batteries according to Examples A1 to A6 present improved capacity density and energy density than that of Comparative Example.

EXAMPLE B1

In Example B1, a positive electrode and a non-aqueous electrolyte that were prepared as follows were used.

Preparation of Positive Electrode

In the preparation of a positive electrode, $FeS_2$ was used as a positive electrode material. $FeS_2$ as the positive electrode material, and polytetrafluoroethylene as a binding agent were mixed with each other in a ratio of 95 to 5 by weight, were formed by pressure of 150 kg/cm² into a disk of a diameter of 10.3 mm and a weight of 50 mg. The resultant disk was dried in vacuum at 50° C., thereby to give the positive electrode of Example B1.

Preparation of Non-aqueous Electrolyte Solution

In the preparation of a non-aqueous electrolyte solution, ethylene carbonate and dimethyl carbonate were mixed in a volume ratio of 1 to 1, to give a mixture solvent, in which a solute of hexafluorophosphoric acid lithium ($LiPF_6$) was dissolved in a concentration of 1 mol/kg.

Further, in Example B1, as shown in FIG. 1, the non-aqueous electrolyte solution 14 prepared as described above was contained in the test cell 10 as well as the positive electrode prepared as described above was used for a working electrode 11 and lithium metal was used for a counter electrode 12 as a negative electrode and for a reference electrode 13, as in above-mentioned Examples A1 to A6.

Continuously, the test cell according to Example B1 was subject to discharge at a 0.5 mA/cm² discharging current to a potential of the working electrode 11 to the reference electrode 13 of 1.0 V, followed by charge at a 0.5 mA/cm² charging current to a potential of the working electrode 11 to the reference electrode 13 of 2.5 V.

With regard to the test cell according to Example B1 wherein $FeS_2$ is used as the positive electrode material, a relationship of a voltage and a specific capacity (Ah/kg) of the positive electrode material at a first discharge is graphed out as a discharge curved line described in a broken line while a relationship of a voltage and a specific capacity (Ah/kg) of the positive electrode material at a first charge is graphed out as a charge curved line described in a solid line in FIG. 14.

As apparent from the results, in the test cell according to Example B1 wherein $FeS_2$ is used as the positive electrode material, a flat discharge potential of about 1.5 V is attained, and the specific capacity of the positive electrode material at the discharge of the first cycle is 524 Ah/kg. Therefore, the positive electrode material presents higher specific capacity, compared with $LiCoO_2$ having the specific capacity of about 150 Ah/kg which has been conventionally used as a positive electrode material.

Further, in the non-aqueous electrolyte battery according to Example B1 wherein $FeS_2$ is used as the positive electrode material, and a lithium alloy (Li—Si) having the specific capacity of 3000 Ah/kg as disclosed in the Japanese Patent Laid-Open No. 2000-321200 and the Japanese Patent Laid-Open No. 2000-321201 is used as the negative electrode material, capacity density (Ah/kg) and energy density (Wh/kg) at the discharge of the first cycle were found in the same manner as in the above-mentioned Examples A1 to A6. The lithium alloy may include Ag, Al, Au, Bi, Ca, Co, Ga, Ge, Hg, In, Ir, Mg, Pb, Pd, Pt, Rh, Sb, Se, Si, Sn, Sr and Zn. The results are shown in the following Table 3.

TABLE 3

| | positive electrode material | | negative electrode material | | | |
|---|---|---|---|---|---|---|
| | type | specific capacity (Ah/kg) | type | specific capacity (Ah/kg) | capacity density (Ah/kg) | energy density (Wh/kg) |
| Example B1 | $FeS_2$ | 524 | Li—Si | 3000 | 515 | 670 |
| Comparative Example B1 | $LiCoO_2$ | 150 | Graphite | 370 | 107 | 384 |

As apparent from the results, the non-aqueous electrolyte battery according to Example B1 presents improved capacity density and energy density, compared with that according to Comparative Example.

Example C1

In Example C1, a positive electrode and a non-aqueous electrolyte solution which were fabricated as followers were used.

Preparation of Positive Electrode

In the preparation of a positive electrode, $NaFeO_2$ which is the transition metal oxide having the crystal structure of space group R3m is used as a positive electrode material. Further, $NaFeO_2$ as the positive electrode material, acetylene black as a conductive agent, and polytetrafluoroethylene as a binding agent were mixed in a ratio of 40 to 40 to 20 by weight, were formed by pressure into a disk of a diameter of 16 mm and a thickness of 0.1 mm. The resultant disk was dried in vacuum at 110° C., thereby to give the positive electrode of Example C1.

Preparation of Non-aqueous Electrolyte Solution

In the preparation of a non-aqueous electrolyte solution, ethylene carbonate and dimethyl carbonate were mixed in a volume ratio of 1 to 1, to give a mixture solvent, in which a solute of hexafluorophosphoric acid lithium ($LiPF_6$) was dissolved in a concentration of 1 mol/kg.

Next, in Example C1, as shown in FIG. 1, the non-aqueous electrolyte solution 14 prepared as described above was contained in a test cell 10 as well as the positive electrodes prepared as described above was used for a working electrode 11 and lithium metal was used for a counter electrode 12 as a negative electrode and for a reference electrode 13, as in the above-mentioned Examples A1 to A6.

Further, the test cell according to Example C1 was subject to discharge at a 2 mA/cm² discharging current to a potential of the working electrode 11 to the reference electrode 13 of 0.5 V, followed by charge at a 2.0 mA/cm² charging current to a potential of the working electrode 11 to the reference electrode 13 of 4.0 V. Afterward, discharge/charge was repeatedly performed as in the above-mentioned manner.

Figure 15:
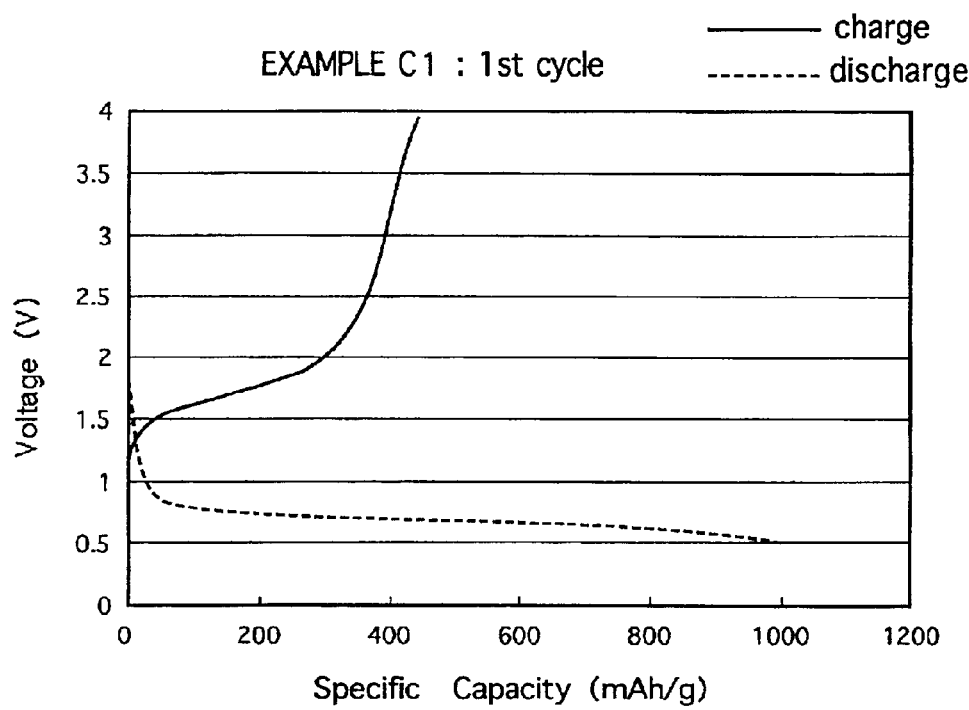
FIG. 15 is a diagram illustrating characteristics of discharge/charge at a first cycle in a test cell according to Example C1 of the present invention wherein $NaFeO_2$ is used as a positive electrode material.
Figure 16:
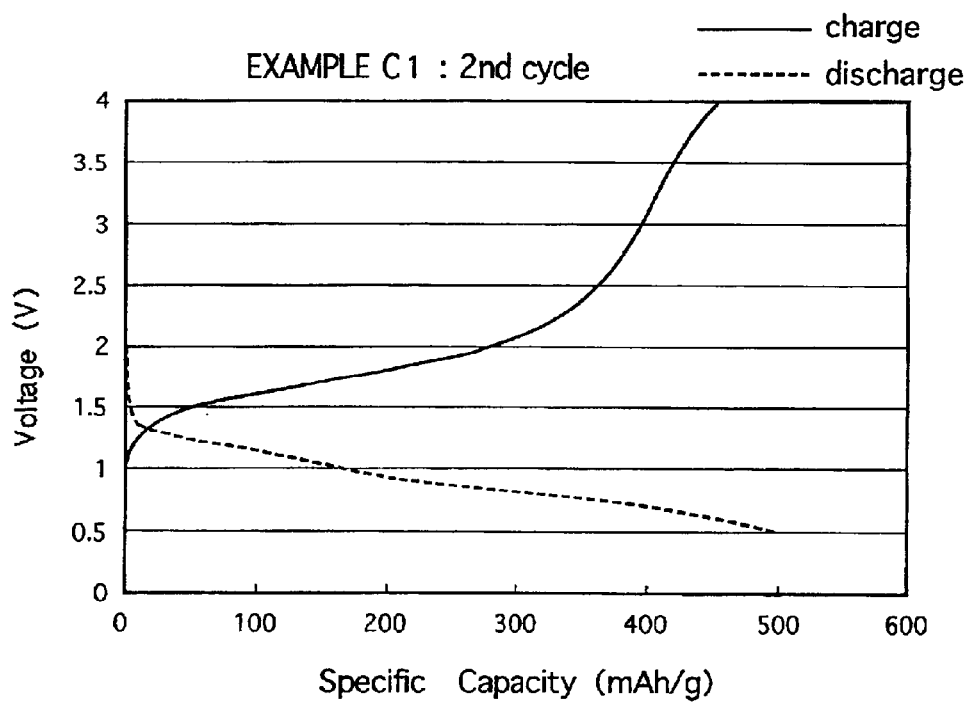
FIG. 16 is a diagram illustrating characteristics of discharge/charge at a second cycle in the test cell according to the above-mentioned Example C1.

With regard to the test cell according to Example C1 wherein $NaFeO_2$ is used as the positive electrode material, a relationship of a voltage and a specific capacity (mAh/g) of the positive electrode material at a first discharge is graphed out as a discharge curved line described in a broken line while a relationship of a voltage and a specific capacity (mAh/g) of the positive electrode material at a first charge is graphed out as a charge curved line described in a solid line in FIG. 15. Further, a relationship of a voltage and a specific capacity (mAh/g) of the positive electrode material at a second discharge is graphed out as a discharge curved line described in a broken line while a relationship of a voltage and a specific capacity (mAh/g) of the positive electrode material at a second charge is graphed out as a charge curved line described in a solid line in FIG. 16.

Figure 17:
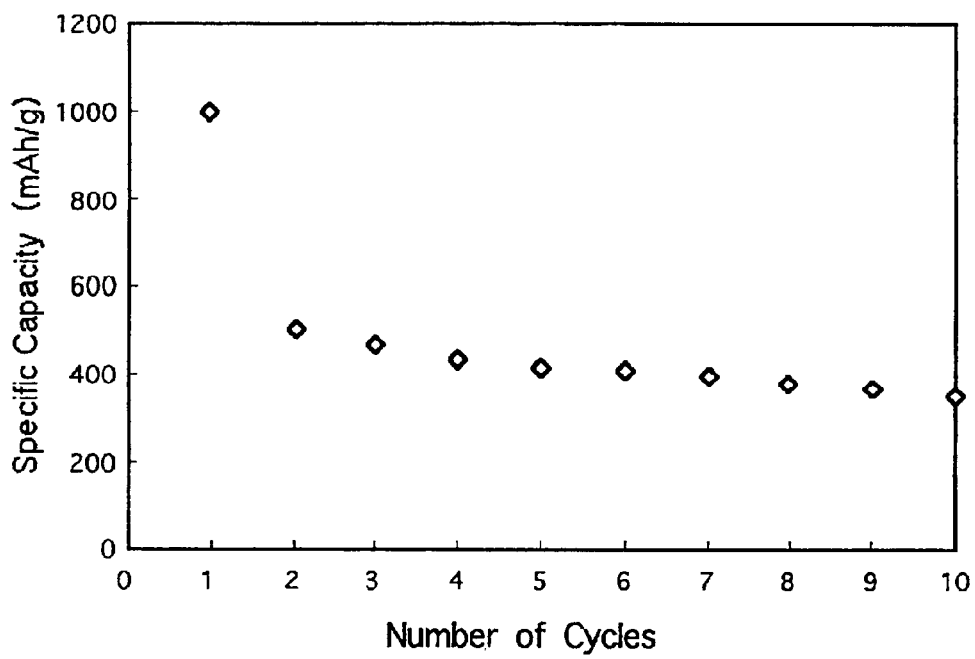
FIG. 17 is a diagram illustrating a relationship between the number of cycles and a specific capacity of a positive electrode material in the test cell according to the above-mentioned Example C1; and, FIG. 18 is a diagram illustrating a relationship between the number of cycles and discharge/charge efficiency in the test cell according to the above-mentioned Example C1.

Discharge/charge was repeatedly performed in a cycle of the above-mentioned discharge/charge process, so that the specific capacity (mAh/g) of the positive electrode material at each cycle was found. The results are shown in the following FIG. 17.

Figure 18:
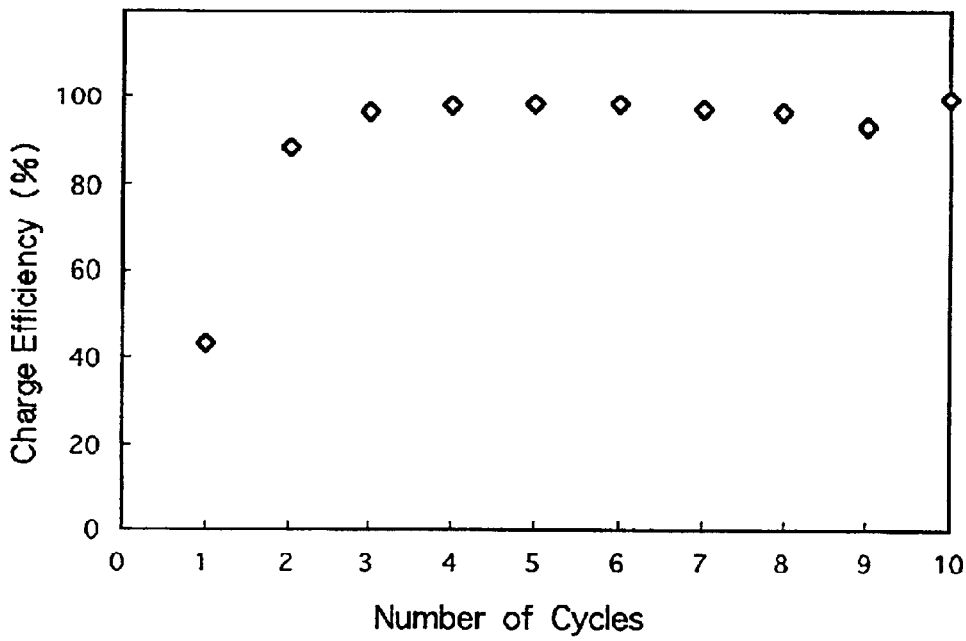

Moreover, a ratio of charge capacity to discharge capacity at each cycle, that is, discharge/charge efficiency (%) was found. The results are shown in the following FIG. 18.

As apparent from the results, in the case where $NaFeO_2$ which is the transition metal oxide having the crystal structure of space group R3m is used as the positive electrode material, the specific capacity of the positive electrode material at the first discharge is as high as 993 mAh/g. It is also apparent that the specific capacity of the positive electrode material drops sharply between the first and second discharge, and that even after the second discharge at which the specific capacity drops sharply, $NaFeO_2$ as the positive electrode material presents extremely higher specific capacity, compared with $LiCoO_2$ having the specific capacity of 150 mAh/g which has been conventionally used.

In addition, after the second discharge, the positive electrode material presents an extremely small decrease of the specific capacity, and charge efficiency of approximately 100%, making it possible to charge and discharge stably in high battery capacity.

Next, in the non-aqueous electrolyte battery according to Example C1 wherein $NaFeO_2$ having the specific capacity of 993 mAh/g is used as the positive electrode material, and a lithium alloy (Li—Si) having the specific material of 3000 mAh/g which is disclosed in the Japanese Patent Laid-Open No. 2000-321200 and the Japanese Patent Laid-Open No. 2000-321201, and in the non-aqueous electrolyte battery according to Comparative Example wherein $LiCoO_2$ having the specific capacity of 150 mAh/g is used as the positive electrode material, and graphite having the specific capacity of 370 mAh/g is used as the negative electrode material, capacity density (Ah/kg) and energy density (Wh/kg) at the discharge of the first cycle were found. The results are shown in the following Table 4. The lithium alloy may include Ag, Al, Au, Bi, Ca, Co, Ga, Ge, Hg, In, Ir, Mg, Pb, Pd, Pt, Rh, Sb, Se, Si, Sn, Sr and Zn.

TABLE 4

| | positive electrode material | | negative electrode material | | | |
|---|---|---|---|---|---|---|
| | type | specific capacity (Ah/kg) | type | specific capacity (Ah/kg) | capacity density (Ah/kg) | energy density (Wh/kg) |
| Example C1 | $NaFeO_2$ | 993 | Li—Si | 3000 | 746 | 448 |
| Comparative Example | $LiCoO_2$ | 150 | Graphite | 370 | 107 | 384 |

As apparent from the results, the non-aqueous electrolyte battery according to Example C1 presents improved capacity density and energy density, compared with that according to Comparative Example.

Although the present invention has been fully described by way of examples, it is to be noted that various changes and modification will be apparent to those skilled in the art. Therefore, unless otherwise such changes and modifications depart from the scope of the present invention, they should be constructed as being included therein.

What is claimed is:

1. A non-aqueous electrolyte battery provided with a positive electrode, a negative electrode, and a non-aqueous electrolyte using an organic solvent, wherein a positive electrode material comprising ferrite is used for said positive electrode, and a lithium alloy is used as a negative electrode material for said negative electrode, wherein said ferrite is $CoFe_2O_4$.

2. The non-aqueous electrolyte battery according to claim 1, wherein the negative electrode material for said negative electrode is a lithium alloy (Li—Si).

3. The non-aqueous electrolyte battery according to claim 1 is a secondary battery wherein discharge/charge is repeatedly performed.

4. A non-aqueous electrolyte battery provided with a positive electrode, a negative electrode, and a non-aqueous electrolyte using an organic solvent, wherein a positive electrode material comprising ferrite is used for said positive electrode, and a lithium alloy is used as a negative electrode material for said negative electrode, wherein said ferrite is $Fe_2O_3$.

5. A non-aqueous electrolyte battery provided with a positive electrode, a negative electrode, and a non-aqueous electrolyte using an organic solvent, wherein a positive electrode material comprising ferrite is used for said positive electrode, and a lithium alloy is used as a negative electrode material for said negative electrode, wherein said ferrite is $Fe_3O_4$.

6. A non-aqueous electrolyte battery provided with a positive electrode, a negative electrode, and a non-aqueous electrolyte using an organic solvent, wherein a positive electrode material comprising ferrite is used for said positive electrode, and a lithium alloy is used as a negative electrode material for said negative electrode, wherein said ferrite is $MnFe_2O_4$.

7. A non-aqueous electrolyte battery provided with a positive electrode, a negative electrode, and a non-aqueous electrolyte using an organic solvent, wherein a positive electrode material comprising ferrite is used for said positive electrode, and a lithium alloy is used as a negative electrode material for said negative electrode, wherein said ferrite is $NiFe_2O_4$.

* * * * *